US006533209B2

(12) United States Patent
Stratico et al.

(10) Patent No.: US 6,533,209 B2
(45) Date of Patent: Mar. 18, 2003

(54) DYNAMO-ELECTRIC MACHINE STATOR WINDER METHODS AND APPARATUS WITH LOOP-FORMING WIRE PULLERS

(75) Inventors: Gianfranco Stratico, Siena (IT); Pasquale Ciarlitto, Florence (IT)

(73) Assignee: Axis USA, Inc., Tampa, FL (US)

( * ) Notice: Subject to any disclaimer, the term of this patent is extended or adjusted under 35 U.S.C. 154(b) by 162 days.

(21) Appl. No.: 09/740,518

(22) Filed: Dec. 19, 2000

(65) Prior Publication Data

US 2001/0047580 A1 Dec. 6, 2001

Related U.S. Application Data

(60) Provisional application No. 60/172,040, filed on Dec. 23, 1999.

(51) Int. Cl.[7] ............................................. H02K 15/085
(52) U.S. Cl. ...................................... 242/432.4; 29/596
(58) Field of Search ........................ 242/432.4, 432.5, 242/432.6; 29/596, 605

(56) References Cited

U.S. PATENT DOCUMENTS

| | | | | |
|---|---|---|---|---|
| 5,090,108 A | * | 2/1992 | Banner et al. | ................. 29/596 |
| 5,535,503 A | * | 7/1996 | Newman | ...................... 29/596 |
| 5,833,166 A | * | 11/1998 | Newman | .................. 242/432.4 |
| 5,946,792 A | * | 9/1999 | Beakes | .......................... 29/596 |
| 6,108,897 A | | 8/2000 | Beakes et al. | |

FOREIGN PATENT DOCUMENTS

WO  WO 00/46903  8/2000

* cited by examiner

*Primary Examiner*—Emmanuel Marcelo
(74) *Attorney, Agent, or Firm*—Fish & Neave; Manu J. Tejwani; Edward M. Arons

(57) ABSTRACT

Methods and apparatus for winding wire coils on cores of dynamo-electric machine components such as stators and alternators are provided. The apparatus may be used to wind wire coils on the poles of a stator. The apparatus includes a movable wire dispenser and a set of wire pullers. The wire pullers are used to form a loop in an initial stretch of wire dispensed by the wire-dispenser alongside a stator pole. The loop is first formed adjacent to the pole and then moved above the pole out of the paths of subsequent wire stretches dispensed to form the wire coils. The loop may be pulled taut in either direction upon completion of the winding operation to connect the wire to a terminal.

4 Claims, 3 Drawing Sheets

DYNAMO-ELECTRIC MACHINE STATOR WINDER METHODS AND APPARATUS WITH LOOP-FORMING WIRE PULLERS

This application claims the benefit of U.S. Provisional Application No. 60/172,040, filed Dec. 23, 1999.

BACKGROUND OF THE INVENTION

This invention relates to methods and apparatus for winding wire coils on cores of dynamo-electric machine components such as electric motor stators and alternators.

A stator is the outer body of an electric motor. The stator houses wire coils on an iron core. The core may be formed by stacking laminations that have holes through their centers. An insulator board with terminal posts may be attached to an end of the resulting lamination stack. The core thus formed has a walled body with an external surface and an interior surface.

The interior surface defines a longitudinal bore that extends from a back face to a front face. Further, the interior surface has a number of longitudinal slots or grooves. A pair of adjacent slots defines a stator pole between the slots. The pole extends radially inward into the stator bore and has an elongated shape with longitudinal sides formed by the adjacent slots. A wire coil is wound around the pole by placing wire stretches in the adjacent slots and around ends of the pole.

A coil holder form may be attached to the pole to support portions of the coil upward. The coil holder form may be an extension of the pole and may extend out of the bore to axial ends beyond the front face and/or back face of the walled body to support external portions of the coil upward. The axial ends of the form often have coil retaining wall-like structures to prevent wire coils from spilling over the ends. Hereinafter, the term "pole" may be understood to include any attached coil holder form, and the terms "pole" and "coil holder" may be used interchangeably.

The wire coils are often wound using automated machinery that includes a movable wire dispenser. The wire dispenser travels back and forth through the stator bore alongside the pole, dispensing wire that is deposited on the pole to form the wire coil. A wire guide or shroud is often attached to the pole during the winding of the wire coil to help guide the wire to its final position in the coil. Locking blades inserted from the exterior surface through the body of the core or other suitable devices may be used to attach the shroud to the pole. The shrouds are especially useful in guiding dispensed wire at the ends of the pole where the wire dispenser rotates to cross over from one side of the pole to the other side.

Starting and ending stretches of wire that form the coil are used as lead wires to pass current through the coil. Loose lead wires can cause the wire coil to unwind. Therefore, after completion of the coil winding, lead wires are terminated and fastened, for example, to terminal posts on the insulator board attached to the lamination stack.

For versatility in stator orientation with respect to sources of current supply, the stator may have insulator boards with terminal posts on either or both the front and back faces. However, the starting stretch is often buried under subsequently wound wire stretches, disadvantageously limiting the direction and amount of wire that is available to reach terminal posts. For example, pulling the buried starting stretch toward the back face to reach terminal posts can disturb the wire coil itself.

Another disadvantage common to current methods of winding wire coils is that the starting wire stretch is in the path of subsequent wire stretches. The physical contact between the starting wire stretch and subsequent stretches as they (the subsequent stretches) are being dispensed can damage wire insulation. Damaged wire insulation may lead to electrical shorts and other reliability problems in stator operation.

It would therefore be desirable to have a starting wire stretch that can be optionally pulled in any direction without disturbing the wire coil. It would also be desirable to be able to position the starting wire stretch so that it does not contact subsequent wire stretches as they are being dispensed.

In view of the foregoing, it is an object of this invention to provide a solution for the problems associated with the positioning of the starting stretch of wire in winding of wire coils.

SUMMARY OF THE INVENTION

This and other objects of the invention are accomplished by providing wire winding methods and apparatus that include using a set of loop-forming wire pullers. The apparatus includes a movable wire dispenser that dispenses wire stretches to form a coil on a workpiece, for example, a stator core, and a set of wire pullers that are placed in proximity to the front of the workpiece. The wire pullers have ends that can engage and deflect portions of wire stretches.

At the start of the winding operation, the wire dispenser translates through the bore dispensing a starting stretch of wire extending from the back of the workpiece to the front of the workpiece. The wire dispenser then substantially ceases movement as necessary to hold the starting stretch in a substantially fixed location. With the starting stretch in the substantially fixed location, the end of a first wire puller moves from a position near the pole to a first position away from the pole deflecting a first portion of the starting stretch of wire away from the pole. The end of a second wire puller moves from a position near the pole to another position away from the pole deflecting a second portion of the starting stretch of wire away from the pole. A triangular-shaped loop is thereby formed in the starting stretch adjacent to the pole. Further motion of the wire dispenser across and around the front end of pole positions a leg of the loop over the pole. The loop is thus positioned clear of the paths of subsequent wire stretches dispensed by the wire dispenser.

The loop can be held in position by the wire pullers while subsequent wire stretches are being dispensed to form the coil. Once the winding of the coil is complete, the pullers can be disengaged. The loop can be then pulled taut against the coil without disturbing the coil. The loop may be pulled out in either direction through the bore since it is not buried under the subsequent wire stretches making up the coil.

BRIEF DESCRIPTION OF THE DRAWINGS

Further features of the invention, its nature, and various advantages will be more apparent from the following detailed description and the accompanying drawings, wherein like reference characters represent like elements throughout, and in which.

DETAILED DESCRIPTION OF THE INVENTION

Figure 1:
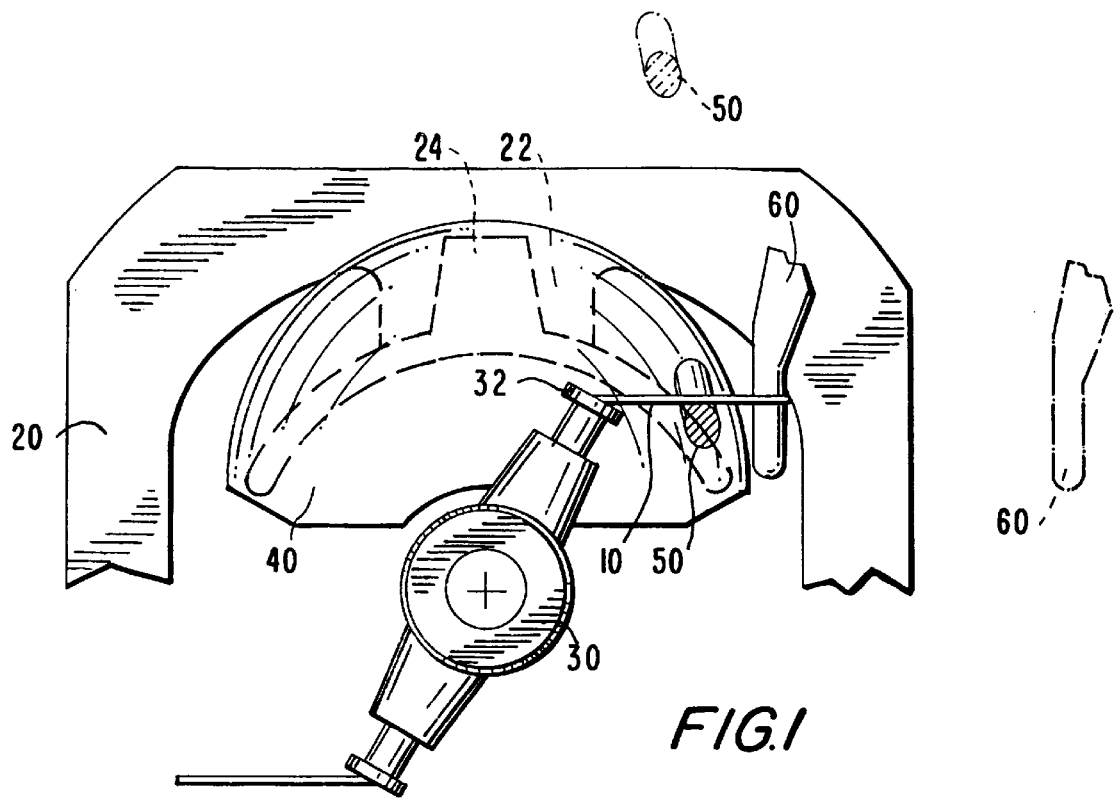
FIG. 1 is an end elevational view showing part of the front end of a stator being wound by a winding apparatus in accordance with the principles of the present invention.

The invention provides solutions for winding coils on dynamo-electric machine components. In order that the invention herein described can be fully understood, the following detailed description is set forth in the context of its application to electric motor stators. It will, however, be understood that the invention is equally applicable to other types of dynamo-electric machine parts such as alternators, etc.

In accordance with the present invention, an apparatus for winding wire coils on a core of a stator includes a movable wire dispenser. The wire dispenser can, for example, have a hollow needle or nozzle with an orifice. The wire dispenser may draw wire, for example, from a wire spool, and dispense it through the orifice. The wire dispenser can be attached to an arm or any other suitable mechanism that moves the wire dispenser along the sides of a stator pole and provides the force required to overcome tension in drawing wire from the spool. Movement of the wire dispenser along linear and curved paths can include, for example, translation, reciprocation, rotation, and oscillation. The wire dispenser may translate along the longitudinal sides of an elongated pole structure and rotate across the ends of the pole.

Further, the invention may include a first and a second wire puller that have forms suitable for engaging and deflecting wires. The forms of the wire pullers may include but are not limited to blades, rods, and paddles. The wire pullers may operate serially or simultaneously. The wire pullers are placed in initial positions near or about the front face of the stator in proximity to the pole. The initial positions of the first and second wire pullers are referred to herein as the "inner position" and "lower position," respectively.

In operation the wire dispenser dispenses wire stretches along the sides, the front end and the back end of the pole to form the wire coil. A first of these wire stretches is referred to herein as "the starting stretch." In dispensing the starting stretch the wire dispenser can travel from a position behind the back face, passing through the bore along a side of the pole, to a position in front of the stator. The wire dispenser may travel far enough past the front face of the stator to be in a position to rotate clear of the front end of the pole and any attached shroud. The starting stretch may or may not touch surfaces of the shroud. In either case, the wire dispenser reproducibly dispenses the starting stretch in a substantially predetermined location relative to the pole and any attached shroud.

The movement of the wire dispenser is then substantially curtailed as necessary to hold the starting stretch substantially fixed in its predetermined location alongside the pole. The wire dispenser may, for example, cease movement across the front end to avoid dispensing additional wire that may be imprecisely or uncontrollably launched on surfaces of the shroud and thereby irreproducibly change the location of the starting stretch.

With the starting stretch in its predetermined location alongside the pole, the first and second wire pullers move from their respective initial positions to respective later positions to engage and deflect portions of the starting stretch. The respective later positions of the first and second wire pullers are referred to herein as the "outer position" and "upper position," respectively. The outer and upper positions can be adjustable apparatus parameters.

The first wire puller deflects a first portion of the starting stretch away from the pole toward or beyond the outer periphery of the stator. The second wire puller deflects a second portion of the starting stretch upwardly away from the pole and toward the back face forming a loop in the starting stretch. The loop is formed adjacent to one side of the pole.

On completion of the movements of both wire pullers, the loop may have an approximately triangular shape with vertices at the wire dispenser and at the two wire pullers. A first leg of wire in the loop extends from the first wire puller up to an apex at the second wire puller, and a second leg of wire extends down from the apex to the wire dispenser. The radial and axial coordinates of the apex relative to the stator can be preset by suitably adjusting the upper position. Radially, the apex (i.e., the top of the loop) may have an altitude toward or beyond the outer periphery of the stator. Axially, the apex may be at any distance from the front face of the stator. The apex may, for example, be over the shroud, over the coil holder extending forward from the front face, or at one extreme, even be over the exterior surface of the stator toward the back face.

During this operation, when the wire pullers sequentially or simultaneously deflect portions of the starting stretch, the pullers draw additional lengths of wire from the wire spool through the orifice working against tension in the wire. Low tension may correspond to smooth operation of the apparatus and reproducible positioning of the wire in predetermined locations. However, the tension may increase if the wire dispenser is simultaneously moving and drawing wire from the wire spool. Therefore, to minimize the tension against which the pullers have to work, the wire dispenser may, preferably, be substantially stationary while the pullers deflect portions of the starting stretch. The wire dispenser may be parked, for example, in front of the front end of the pole and any attached shroud.

After the loop-forming movements of the wire pullers are substantially complete, the wire dispenser rotates across the front end and begins to translate toward the back face along a side of the pole opposite the starting stretch. By these motions the wire dispenser dispenses additional wire that lengthens the second leg and places it over the top of the pole so that the loop is clear of the paths of subsequent wire stretches destined to be wound on the pole.

Alternately, the wire dispenser may begin to place the second leg of the loop over the top of the pole substantially concurrently with the movements of one or both of the wire pullers forming the loop.

A gap between the plane of the approximately triangular loop and the top of the coil retaining wall-like structure (or the top of any attached shroud) provides clearance for the subsequent wire stretches to be deposited. The gap may be suitably preset by adjusting apparatus parameters such as the initial and later positions of the pullers. A suitable gap may account, for example, for dimensions of the stator and the shroud, number of wire turns in the coil, and apparatus parameters such as the speed of the wire dispenser, etc. The suitable gap may be obtained, for example, by adjusting the upper position of the second wire puller to have apex coordinates corresponding to the desired gap.

In further operation, with the loop placed above the pole and substantially clear of the paths of subsequent wire stretches, the wire dispenser may dispense subsequent wire stretches without dispensed wire coming in contact with or burying the starting stretch. Once the winding of the coil is complete, the wire pullers may be disengaged. Then, the loop can be pulled taut against the wire coil, as desired, without disturbing the coil, because the loop is not buried under the subsequent wire stretches. The loop may be pulled out in either direction through the bore.

An embodiment of the invention will now be illustrated with reference FIGS. 1–5.

FIG. 1 shows part of the front end of stator 20 being wound by an apparatus in accordance with the principles of the present invention. The end of stator 20 shown in FIG. 1 is the end remote from a mechanism that actuates wire-depositing needle 30, and from which a start lead wire of the coil being wound is held. Wire-depositing needle 30 has dual wire dispensing outlets 32. Dual outlets 32 enable the apparatus to wind coils simultaneously in slots 22 on diametrically opposite sides of stator 20. Pairs of adjacent slots 22 define poles 24. Shrouds 40 are attached to poles 24 to ease placement of dispensed wire 10 over front ends of coil holders attached to poles 24.

A pair of loop-forming wire pullers 50 and a pair of loop-forming wire pullers 60 are provided in the apparatus. Movement of wire pullers 50 and 60 may be actuated using conventional means. These conventional means may include but are not limited to electric motors, drive trains, and pneumatic actuators. Preferably, the wire pullers and suitable portions of the conventional means are placed in front of the stator without using space on the top and sides of the stator. Thus, the space on the top and sides of the stator may be reserved exclusively, for example, for other fixtures such as those used to align and hold the stator in place including those that operate locking blades for attaching shrouds.

Wire pullers 50 in the pair provided (and similarly wire pullers 60) are placed on diametrically opposite sides of the stator in proximity to front ends of poles 24. The apparatus and its operation are diametrically symmetric. Therefore, for simplicity, only those poles 24, shrouds 40, and wire pullers 50 and 60, etc., that are in the upper half of the apparatus are shown and described herein. Two successive positions of puller 60 in the operation of the apparatus, an intermediate position and an outer position, are shown in FIG. 1. The intermediate position can be between a position between an inner position and the outer position. Similarly, two successive positions of puller 50, a lower and an upper position, are also shown in FIG. 1.

At the start of the winding operation, an end of wire 10 to be wound is held by temporary anchor 12 (FIG. 4) adjacent to the back face of stator 20. Anchor 12 can be any suitable device for fastening the end of wire 10. With the end of wire 10 anchored, wire-depositing needle 30 translates away from anchor 12 through stator 20 with wire outlet 32 passing along a side of pole 24 dispensing a starting stretch of wire in slot 22. The starting stretch may or may not touch surfaces of shroud 40. FIG. 1 shows wire-depositing needle 30 after it has translated through the bore of stator 20 and is beyond a free axial end of shroud 40 on the end of stator 20 remote from anchor 12.

Figure 4:
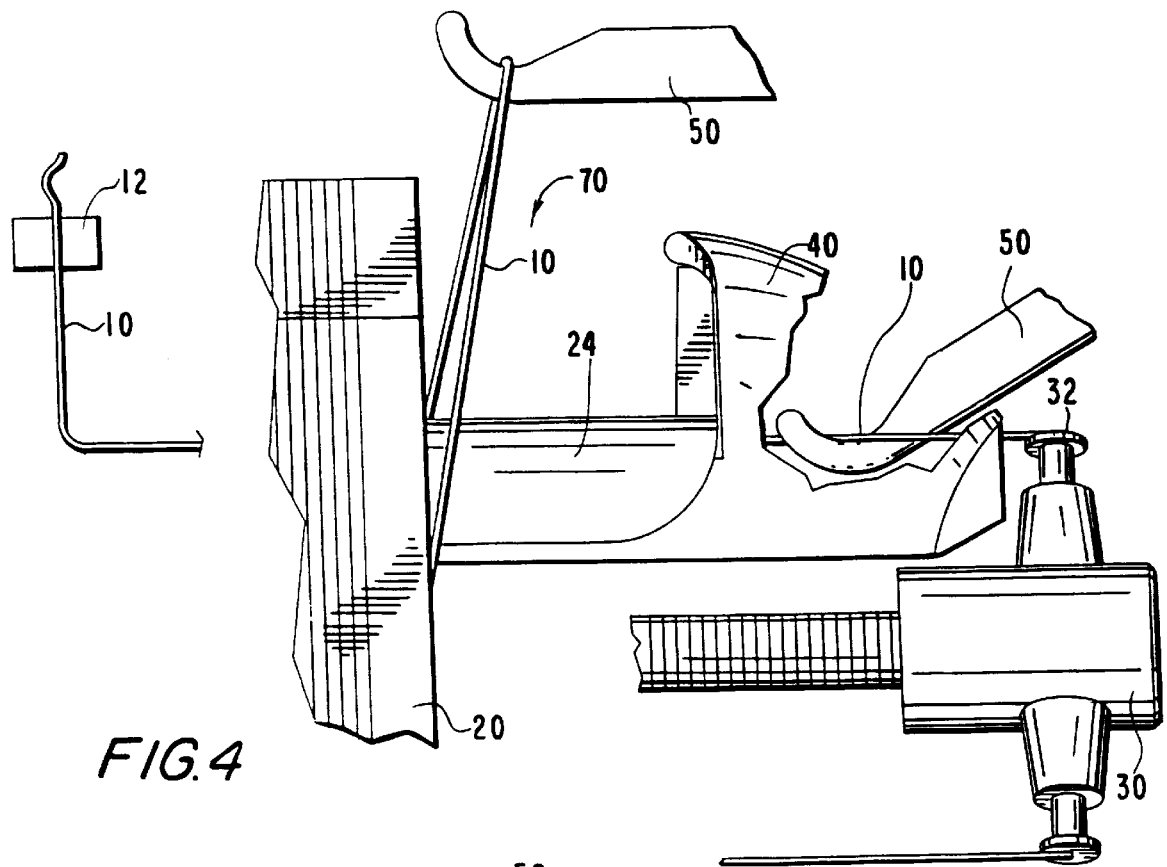
FIG. 4 is a partial side elevational view of the apparatus and stator shown in FIGS. 1–3, with a portion cut away, showing two successive positions of another wire puller in the winding apparatus in accordance with the principles of the present invention.
Figure 5:
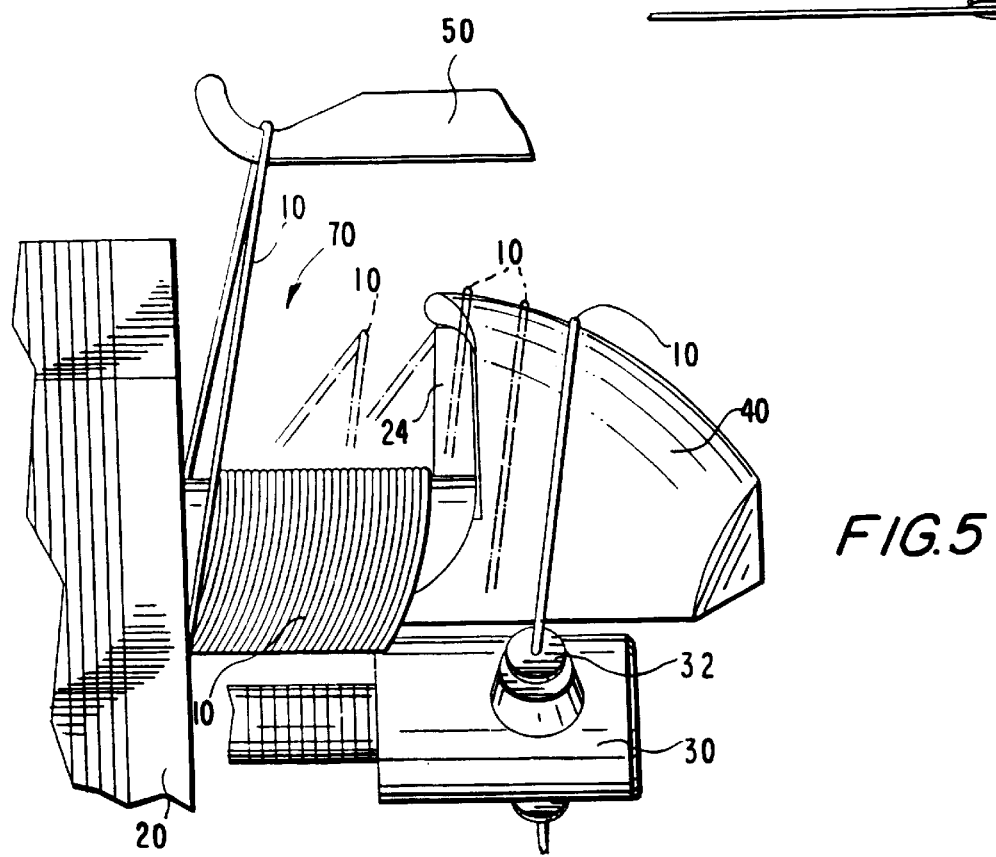
FIG. 5 is a view similar to FIG. 4 showing the stator at a later stage in the operation of the winding apparatus in accordance with the principles of the present invention.

After the starting stretch is dispensed, pullers 50 and 60 move from the lower and inner positions to the upper and outer positions, respectively. In moving to the later positions wire pullers 50 and 60 engage and deflect portions of wire 10 pulling additional wire from wire outlet 32 as needed. Pullers 50 and 60 may have suitable structures that prevent engaged portions from slipping off while the wire pullers are in motion. The structures include, but are not limited to notches, serrations and hooks. FIGS. 4 and 5 show puller 60 with a rounded notch.

Figure 2:
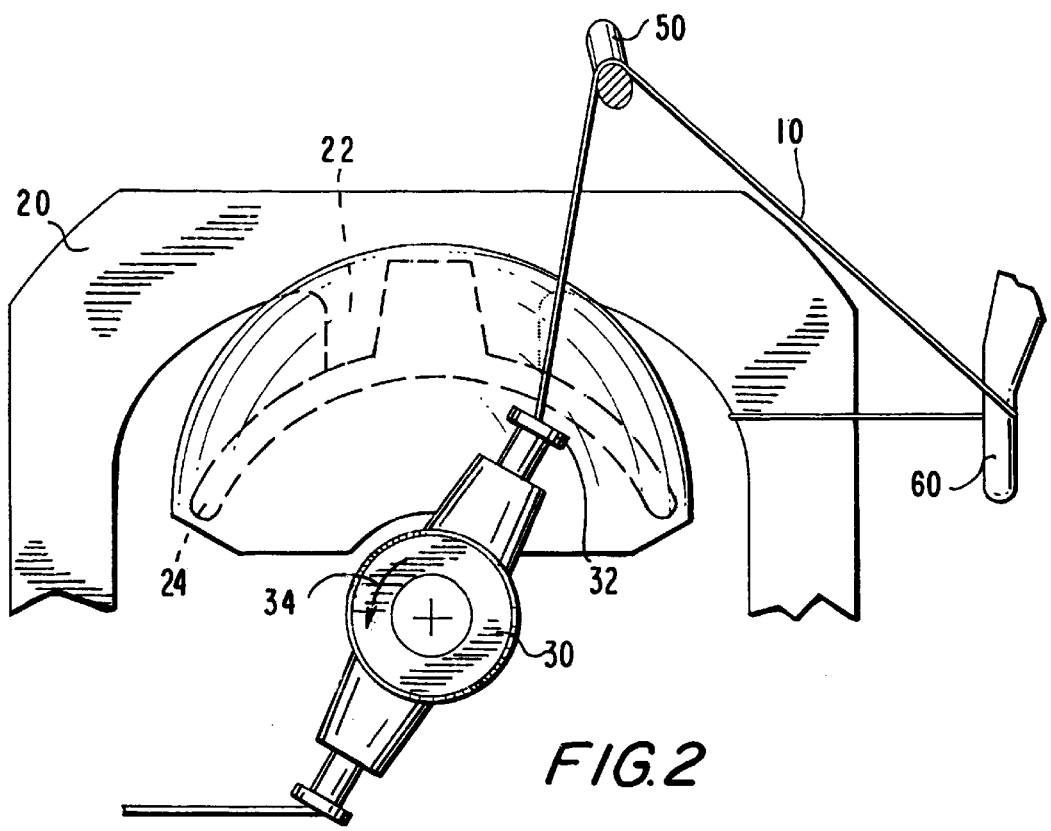
FIG. 2 is a view similar to FIG. 1 showing the stator at a later stage in the operation of the winding apparatus in accordance with the principles of the present invention.

FIG. 2 shows puller 60 at the outer position, having deflected a first portion of wire 10 laterally away from pole 24, and puller 50 at the upper position, having deflected a second portion or wire 10 upwardly away from pole 24 and toward the back face to form a loop in wire 10. The loop is formed adjacent to one side of pole 24 and has an approximately triangular shape with vertices at outlet 32 and wire pullers 50 and 60.

Figure 3:
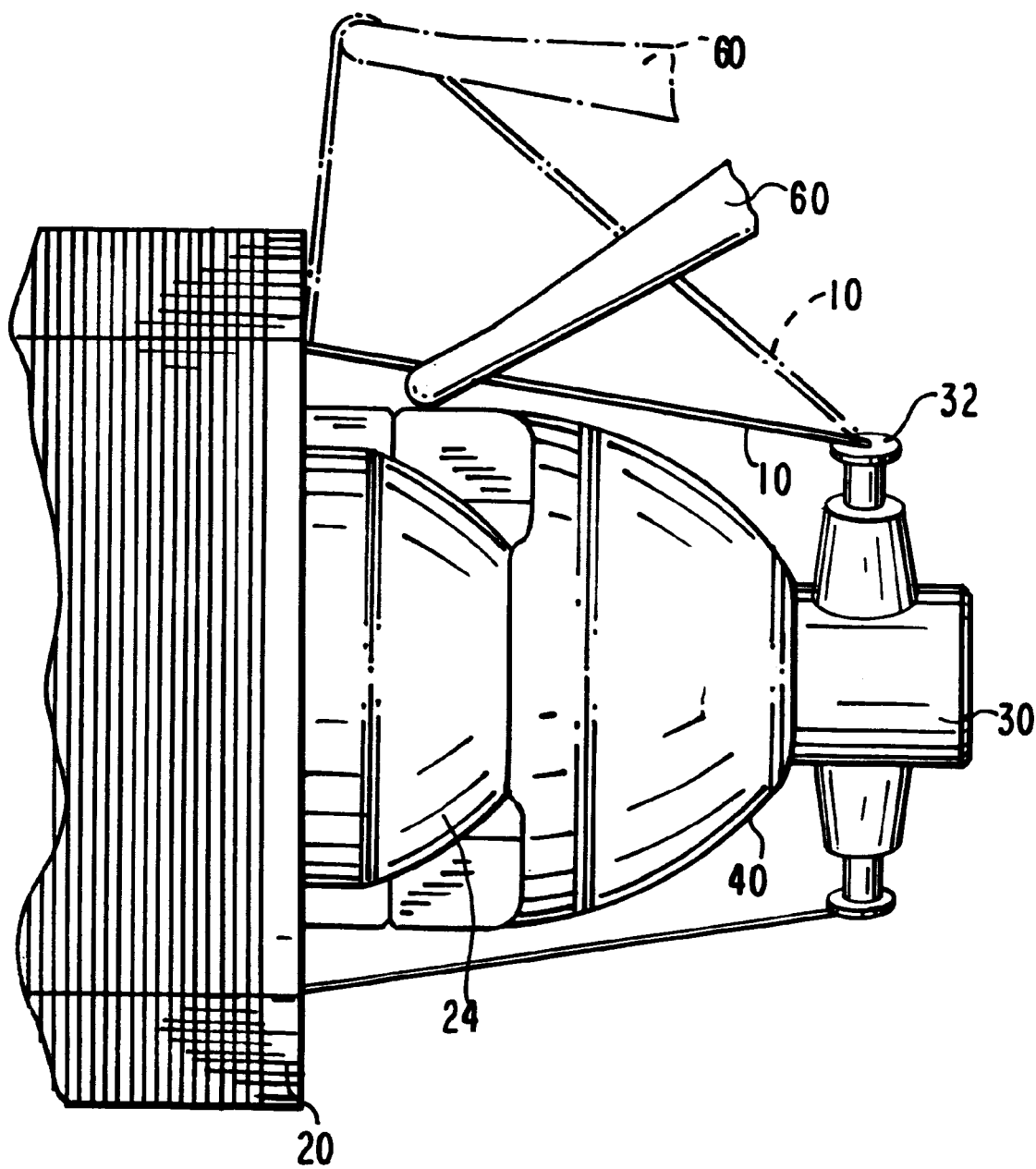
FIG. 3 is a partial plan view of the apparatus and workpiece shown in FIGS. 1 and 2, showing two successive positions of a wire puller of the winding apparatus in accordance with the principles of the present invention.

Wire puller 50 can move to the upper position and wire puller 60 can move to the outer position sequentially or simultaneously. FIG. 3 shows a situation in which wire puller 60 has moved to engage and deflect the first portion of wire 10 laterally away from pole 24. The inner and outer positions of wire puller 60 are shown. For clarity, wire puller 50 is not shown in FIG. 3.

FIG. 4 shows puller 50 having moved to engage and deflect the second portion of wire 10 upwardly away from pole 24 and toward the back face. The lower and upper positions of wire puller 50 are shown. For clarity, wire puller 60 is not shown in FIG. 4. FIG. 4 also shows wire anchor 12 located adjacent the end (i.e., the backface) of stator 20 that is remote from the end shown in FIGS. 1–3.

In further operation of the apparatus, needle 32 moves to dispense additional wire to lengthen a leg of the loop shown in FIG. 2. This motion may include counterclockwise rotation 34 of about 100 degrees from the position of needle 32 shown in FIG. 2 and a translation toward the back face along the side of pole 24 opposite the starting stretch. This motion places the loop over the top of pole 24. For clarity, the motion of needle 32 placing the loop over the top of pole 24 is not depicted in FIG. 4. The loop is held in place over the top of pole 24 by puller 50 in its upper position as shown in FIGS. 4 and 5. Gap 70 indicates the clearance between the plane of the loop and the top of shroud 40. Subsequent stretches of wire may be guided over the shroud 40 to be deposited on the coil holder form attached to pole 24 through gap 70 without contacting the loop.

Preferably, throughout the remaining coil winding operation wire pullers 50 and 60 remain in their above-described upper and outer positions, respectively, holding the loop clear of the paths of subsequent wire stretches. Further winding of the coil of wire on pole 24 proceeds with needle 30 alternately reciprocating axially through stator 20 and oscillating when beyond the axial ends of shroud 40.

FIG. 5 shows wire puller 50 holding the loop back toward the back face of stator 20, while subsequent stretches of wire 10 guided over shroud 40 are deposited on coil holder portions of pole 24 which extends axially beyond the front face of the stator.

In addition to keeping the loop out of the path of subsequent wire stretches, the above-described holding positions of wire pullers 50 and 60 keep the initial stretch of wire 10 leading back through stator 20 to anchor 12 away from pole 24. FIG. 2 shows wire puller 60 at the outer position holding wire 10 laterally away from pole 22 on which the wire coil is formed. Wire 10 may also be held below the lateral plane of pole 22. Placement of the starting stretch in proximity to the wall of stator 20 avoids burying the starting stretch under wire stretches subsequently dispensed during the winding operation. Because the starting stretch of wire 10 is not buried, it can be pulled in either direction as desired (e.g., by the stator manufacturer) after stator 20 has been fully wound and wire pullers 50 and 60 are disengaged from the loop. The loop, for example, can be pulled taut by pulling the starting stretch of wire 10 through the bore toward the back face (i.e., to the left as viewed in FIGS. 4 and 5). Alternatively, the loop can be enlarged or even pulled out completely by pulling the wire in the loop to the right as viewed in FIGS. 4 and 5.

One skilled in the art will appreciate that the present invention can be practiced by other than the described embodiment, which is presented for purposes of illustration and not of limitation, and that the present invention is limited only by the claims which follow.

What is claimed is:

1. An apparatus for winding a wire coil on a pole of a stator, said stator having a front face, a back face, and a longitudinal bore extending from said back face to said front face, said pole having a front end and longitudinal sides extending downward into said bore, said apparatus comprising:

a movable wire dispenser that dispenses wire stretches along said sides and said front end to form said wire coil, said wire stretches including a starting stretch extending from said back face through said bore past said front face;

a first wire puller that engages and deflects a first portion of said starting stretch away from said pole;

a second wire puller that moves upward and toward said front face to engage and deflect a second portion of said starting stretch upwardly away from said pole forming a loop in said starting stretch that will substantially clear of the paths of subsequent wire stretches destined to be wound on said pole when said wire dispenser rotates across said front end and begins to translate toward said back face through said bore.

2. The apparatus of claim 1 wherein said wire dispenser is substantially stationary while said pullers engage and deflect said portions.

3. The apparatus of claim 1 wherein said second wire puller comprises a notch that prevents said second portion from slipping off while said second wire puller is in motion.

4. The apparatus of claim 1 wherein said second wire puller comprises an end for engaging said second portion, said end facing said front face.

\* \* \* \* \*